July 13, 1926. 1,592,518
J. A. CRUICKSHANK
VEHICLE WHEEL
Filed Jan. 10, 1925 2 Sheets-Sheet 1
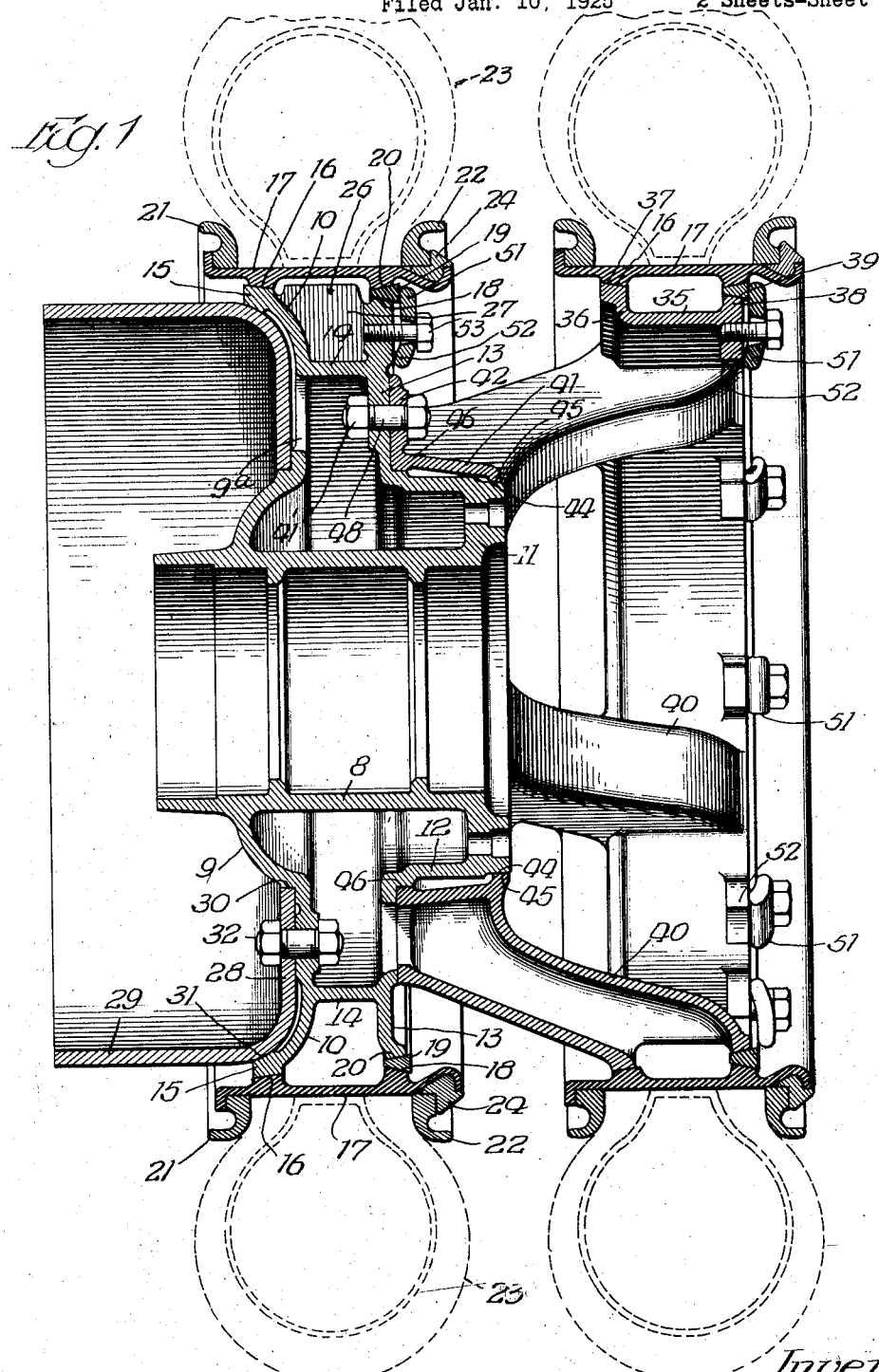

July 13, 1926.
J. A. CRUICKSHANK
VEHICLE WHEEL
Filed Jan. 10, 1925
1,592,518
2 Sheets-Sheet 2
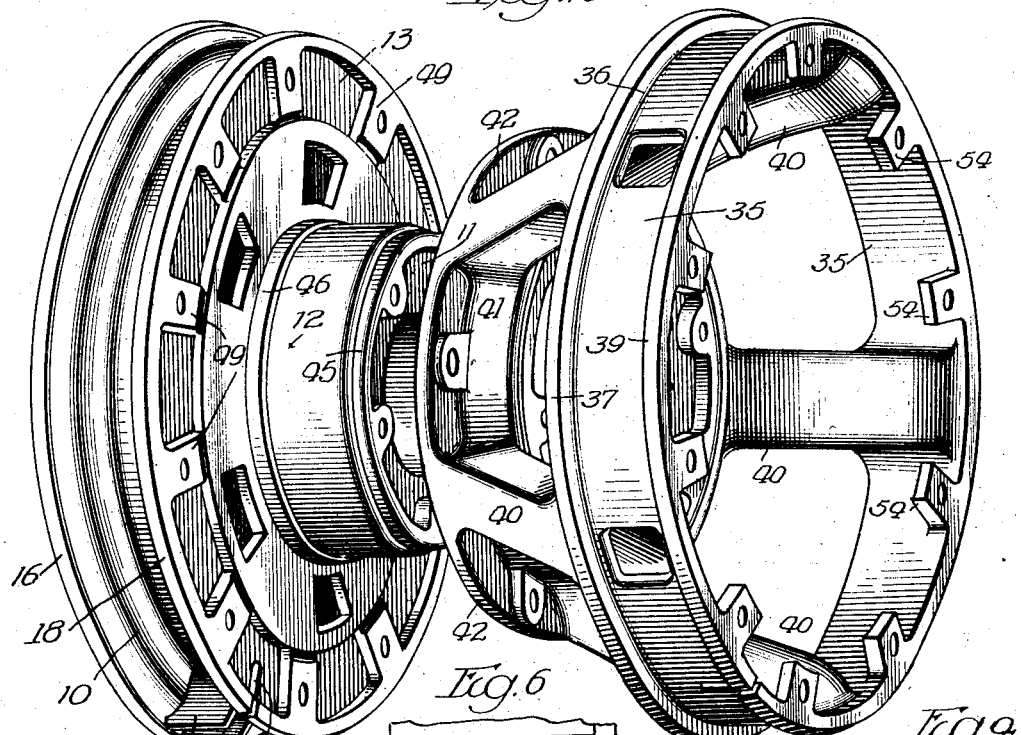
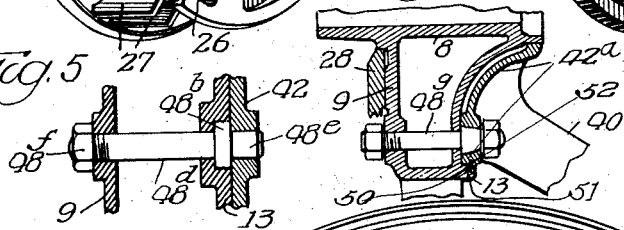
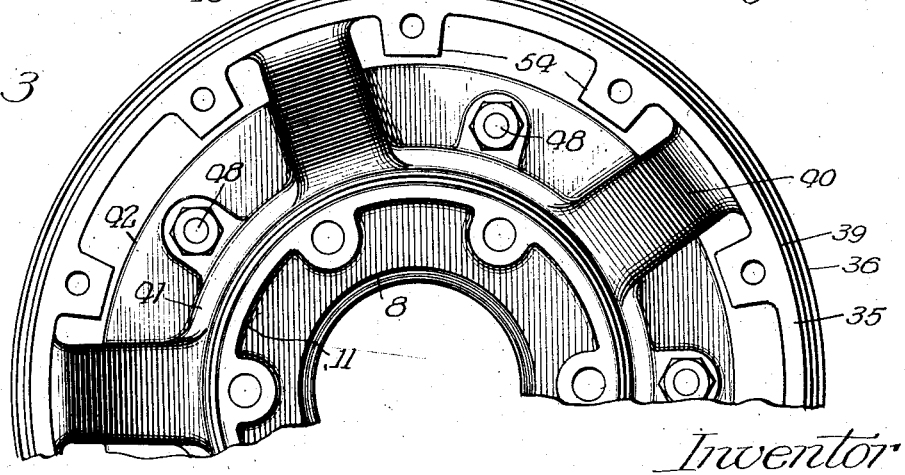
Inventor
James A. Cruickshank
By Fred Gerlach Atty.

Patented July 13, 1926.

1,592,518

UNITED STATES PATENT OFFICE.

JAMES A. CRUICKSHANK, OF CLEARING, ILLINOIS.

VEHICLE WHEEL.

Application filed January 10, 1925. Serial No. 1,535.

The invention relates to vehicle wheels and more particularly to the dual type which are adapted for heavy duty, as on trucks and busses, and which are adapted for use with demountable tire-carrying rims.

The object of the invention is to provide an improved wheel of this type in which the separate wheel bodies are cast and are adapted to be readily secured together and separated to facilitate rim and tire changes on the inner wheel. Another object of the invention is to provide an improved wheel of this type, in which the wheel bodies are made of one piece castings, which are detachably secured together, so as to give efficient service. Other objects will appear from the description.

The invention consists in the several novel features hereinafter set forth and more particularly defined by claims at the conclusion hereof.

In the drawings: Fig. 1 is an axial section of a wheel embodying the invention. Fig. 2 is a perspective of the main and supplementary wheel bodies. Fig. 3 is a side elevation of the wheel, parts being broken away. Fig. 4 is a detail section showing bolts for additionally securing the brake drum, if desired. Fig. 5 is a section showing the manner of providing additional driving pins between the wheel bodies, if desired. Fig. 6 is a detail showing a modified form of the invention.

The invention is exemplified in a wheel composed of two bodies, one of which may be designated as the "main" or "inner" body adapted to be carried on or driven by an axle in any suitable manner, as well understood in the art, and the other of which is designated as the "supplemental" or "outer" wheel body and is adapted to be removably secured to the "main" body, so the bodies will conjointly support the vehicle.

The main body consists of a single casting of suitable metal, such as steel, and comprises a hub 8, which is adapted for connection to the axle or vehicle in any suitable manner, as well understood in the art; an inner web 9, extending outwardly from the hub, forming the inner side of said body, and which has its marginal portion flared backwardly, as at 10; an end web 11 at the outer end of hub 8; a cylindrical portion extending inwardly from the outer margin of end web 11; a web 13, extending outwardly from the inner end of cylindrical portion 12 and forming the outer side of the main body; and an annular web 14 uniting the side webs 9 and 13. An outwardly tapered convergent periphery 15 on the outer margin of the inner body side 9 forms an annular seat for the correspondingly tapered rib 16 on a demountable tire-carrying rim 17; and a tapered periphery 18 formed on the outer margin of the outer web or body side 13 forms an annular seat for a wedge ring 19, which is adapted to be interposed between said side and an annular outwardly flared peripheral seat 20 adjacent the outer side of the demountable rim 17. Seats 16 and 20 are usually formed on the inrolled beads of the rim 17. The latter is provided with rings or flanges 21 and 22 for holding a pneumatic tire 23 of usual construction. A locking ring 24 is adapted to removably hold the ring 22 in its operative position. The rim shown is of the construction generally known as the "universal" type, but it will be understood that any suitable demountable rim may be used. The web forming the outer side of the main body is slotted, as at 26, to permit the valve stem, which projects inwardly from the demountable rim, to enter and be withdrawn from the annular space between webs 13 and 9. Longitudinal lugs 27 extend across the marginal portions of said webs and are adapted to receive between them the usual driving lug on the demountable rim. A brake-drum comprises a radial flange 28 and a peripheral flange 29. The radial flange has an opening which fits around a peripheral shoulder 30 on the body side 9 and the marginal portion of said side is provided with a surface or seat 31 for the drum. Bolts 32, extending through the side 9 and the drum-flange 28, operatively secure the drum to the main wheel body.

The supplemental wheel body consists of a one-piece casting and comprises an annular channelled ring provided with a base 35; an inner flange 36 having a tapered annular seat 37 for the seat 16 of the demountable rim 17; and an outer flange 38 having a tapered peripheral seat 39 for the wedge ring 19, which is adapted to be forced into the space between said seat and the tapered seat 20 of the demountable rim; hollow spokes 40, extending longitudinally towards the main wheel body and radially inward from the base 35 of the channelled ring of the supplemental body; a tubular hub 41 at the inner ends of said spokes; and a side flange 42 extending outwardly from the inner side of said hub. The inner face of flange 42 fits against the outer face of the web 13 of the main body. The cylindrical wall 12 of the main body forms a hollow hub to extend into and support the hub 41 of the supplemental body. At its outer side, the hub 41 is provided with a cylindrical seat 44 fitting around and engaging a peripheral seat 45 on the hub 12. At its inner side, hub 41 is provided with an annular seat 46 fitting around and engaging a peripheral seat 47 at the inner side of hub 12. Bolts 48, which extend through flanges 42 and side 13, secure the wheel bodies together against longitudinal separation and the interfitting hubs 12 and 41 prevent relative radial movement of the bodies, so that they will be rigidly secured together to conjointly receive all of the stresses to which the wheel, as an entirety, is subjected. Lugs 49 in desired number are integrally formed on the outer face of web 13. Clamping members 51 have their inner ends held in seats 52 at the inner end of lugs 40 and have outer ends adapted to engage the wedge-ring 19 to secure it in operative position. Bolts 53 are threaded into lugs 49 and are adapted to draw the clamping members into their operative position and to permit their removal when the demountable rim is to be removed from the main wheel body. The outer side of the channelled ring of the supplemental body is provided with lugs extending radially inward for similar clamping members 51 and bolts 53, provided to removably secure the demountable rim on the supplemental body.

When it is desired to change a rim on the supplemental or outer body, it is only necessary to remove the clamping members 51 and wedge ring 19. When it is desired to replace a demountable rim on the main or inner wheel body, it is necessary to remove the supplemental or outer wheel and this can be readily done, it being only necessary to remove the nuts from bolts 48. When these nuts have been removed, the supplemental wheel body is free to be removed longitudinally from the main body. After the demountable rim on the main body has been changed, the supplemental body may be pushed back into its position around hub 12 and there secured thereon by nuts of bolts 48. Bolts 48 may have their inner ends threaded to the body-side 13 and locked therein by nuts 41', the inner body-side 9 having openings 9$^a$ therein for access to the nuts before the brake-drum is applied to the body.

In some instances, it may be desirable to provide for additional securing means between the brake-drum and the body sides 9 and 13 and this may be readily done, as shown in Fig. 4, by bolts 48$^a$ which are adapted to extend through the brake-drum, the body-sides 9 and 13 and the flange 42. Each of said bolts is provided with an annular shoulder 48$^b$ which is held in a seat in body 13 and is provided with nuts at both of its ends to permit the brake-drum and said flange to be separately secured on the main wheel body. If no brake-drum is to be used for the main wheel body and driving connections, in connection to bolts 48, bolts 48$^d$ may be used to alternate circumferentially with the bolts 48. Each bolt 48$^d$ has a shoulder 48$^b$ seated in the body-side 13 and a stud 48$^e$ to enter a hole in the flange 42 and a nut 48$^f$ at its inner end to secure the bolt in the wheel-body. In this construction, additional driving connections are provided without increasing the number of nuts which must be removed and replaced in the removal and replacement of the supplemental wheel-body.

The invention exemplifies a wheel of the dual type in which each body is adapted to carry a demountable tire rim and is formed of a single casting; in which the supplemental or outer body may be readily attached and detached from the inner body for convenience in making demountable rim changes; in which the peripheral seats for the demountable rim, brake-drum and the supplemental body are formed so they may be easily machined in a lathe and in which the contiguous faces of the bodies may also be easily machined and fitted; in which provision is made for access to the bearing for the main wheel without removal of the supplemental wheel; which can be manufactured at a low cost, and which is efficient for vehicles adapted to carry heavy loads.

In the modification shown in Fig. 6, the inner wheel body is provided with an annular rib 50 which has a tapered seat 51 for the correspondingly tapered periphery 52 formed on the inner face or flange 42$^a$ of the outer wheel. Bolts 48 secure the outer body to the inner body. In this construction, rib 13 supplementally holds the outer wheel body against radial movement relatively to the main wheel-body.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a wheel structure, the combination of a pair of cast bodies, one of which comprises an integral hub, sides and a rim-portion and is adapted for connection to a vehicle to form an inner wheel-body, the other comprising a marginal ring and spokes extending longitudinally inward towards the other body, means to removably secure the outer body to the inner body, a peripheral seat on each body to receive and to fit the inner periphery of a demountable rim, and means for removably holding the rims on the bodies.

2. In a wheel structure, the combination of a pair of cast bodies, one of which comprises an integral hub and sides and is adapted for connection to a vehicle to form an inner wheel body, the other comprising a marginal ring and spokes extending longitudinally inward towards the other body, a hub fitting into a portion of the hub on the inner body, and a flange at the inner end of the spokes, the inner body being provided with a face to fit said flange, means extending through the flange and said face-portion of the inner body to secure the bodies together, tapered peripheral seats on the bodies to receive and to fit the inner peripheries of demountable rims respectively, and means for removably holding the rims on the peripheral seats.

3. In a wheel structure, the combination of a pair of cast bodies, one of which comprises an integral hub and sides and is adapted for connection to a vehicle to form an inner wheel body, the other comprising a marginal ring and spokes extending longitudinally inward towards the other body, a hub and a flange at the inner end of the spokes, the inner body being provided with a face to fit said flange and a hub-portion extending into the outer-hub, means to secure the flange against said face to removably secure the bodies together, means on each of the bodies to receive and to fit the inner periphery of a demountable rim, and means for removably holding the rims on the bodies respectively.

4. In a wheel-structure, the combination of a pair of cast bodies, one of which comprises an integral hub and sides and is adapted for connection to a vehicle to form an inner wheel body, the other comprising a marginal ring and hollow spokes extending longitudinally inward towards the other body, a hub and a flange at the inner end of the spokes, the inner body being provided with a face to fit said flange and a hub-portion extending into the outer-hub, means to secure the flange against said face to removably secure the bodies together, means on each of the bodies to receive and to fit the inner periphery of a demountable rim, and means for removably holding the rims on the bodies respectively.

5. In a wheel-structure, the combination of a pair of cast bodies, one of which comprises an integral hub and sides and is adapted for connection to a vehicle to form an inner wheel body, the other comprising, a marginal ring and spokes extending longitudinally inward towards the other body, a hub and a flange at the inner end of the spokes, the inner body being provided with a face to engage said flange and a hub-portion extending into the outer hub, means extending through the flange and a portion of the inner body to secure the bodies together, a tapered peripheral seat on each body to receive and to fit the inner periphery of a demountable rim, and means for removably holding the rims on the bodies respectively.

6. In a wheel-structure, the combination of a pair of cast bodies, one of which comprises integral sides, a hub and a longitudinally extending connecting wall between and adjacent the outer portions of the sides and is adapted for connection to a vehicle to form an inner wheel-body, the other of which is adapted to form an outer detachable wheel-body and comprises an integral ring, spokes extending longitudinally towards the inner body, and integral means to fit and engage the inner body, means to removably secure the bodies together, a peripheral seat on each body, and means for removably securing the demountable rims on the seats.

7. In a wheel-structure, the combination of a pair of cast bodies, one of which comprises integral sides, a hub and a longitudinally extending connecting wall between and adjacent the outer portions of the sides and is adapted to be connected to a vehicle to form an inner wheel-body, the other of which is adapted to form an outer detachable wheel-body and comprises a ring, spokes extending longitudinally and radially towards the inner body, a hub and flange at the inner end of and integral with the spokes and the ring, the inner body being provided with a face for said flange and a hub portion extending into and fitting the hub on the outer body, a peripheral seat for a demountable rim on each body, and means for removably securing the rims on the seats.

8. In a wheel-structure, the combination of a pair of cast bodies, one of which comprises integral sides, a hub and a longitudinally extending connecting wall between the sides and is adapted for connection to a vehicle to form an inner wheel-body, the other of which is adapted to form an outer detachable wheel-body and comprises a ring having an annular cross-wall and a flange, integral spokes extending longitudinally towards the inner-body, means at the inner end of and integral with the spokes to fit and engage the inner body, a tapered peripheral seat on one side of the inner body and on the flange of the outer body, and means for removably securing a demountable rim on the tapered seats.

9. In a wheel-structure, the combination of a pair of cast bodies, one of which comprises integral sides, a hub and a longitudinally extending connecting wall between the sides and is adapted for connection to a vehicle to form an inner wheel-body, the other of which is adapted to form an outer wheel-body and comprises a ring, and integral hollow spokes extending longitudinally and radially towards the inner body, means at the inner end of and integral with the spokes engaging and fitting the inner body, peripheral seats for demountable rims on the bodies, means for removably securing the rims on the wheel-bodies, a brake-drum and bolts for securing the drum to one side of the inner body.

10. In a wheel structure, the combination of a pair of cast bodies, one of which comprises an integral hub and rim portion and is adapted for connection to a vehicle to form an inner wheel-body, the other comprising an integral marginal ring and spokes extending longitudinally inward towards the other body, means to removably secure the outer body to the inner body, a peripheral seat on each body, said seats being similarly formed and adapted to receive and fit the inner periphery of demountable rims of the same size and means for removably holding the rims on the bodies.

11. In a wheel structure, the combination of a pair of cast bodies, one of which comprises an integral hub and rim portion and is adapted for connection to a vehicle to form an inner wheel-body, the other comprising an integral marginal ring and spokes extending longitudinally inward towards the other body, the contiguous portions of the bodies being provided with interfitting means to hold them against relative radial movement, means to removably secure the outer body to the inner body, a peripheral seat on each body, said seats being similarly formed and adapted to receive and fit the inner periphery of demountable rims of the same size and means for removably holding the rims on the bodies.

12. In a wheel structure, the combination of a pair of cast bodies, one of which comprises an integral hub and rim portion and is adapted for connection to a vehicle to form an inner wheel-body, the other comprising an integral marginal ring and spokes extending longitudinally inward towards the other body, the hub of the inner body being provided with an outward extension, the outer body having an annular portion fitting around said extension, means to removably secure the outer body to the inner body, a peripheral seat on each body, said seats being similarly formed and adapted to receive and fit the inner periphery of demountable rims of the same size and means for removably holding the rims on the bodies.

Signed at Chicago, Illinois, this 30th day of October, 1924.

JAMES A. CRUICKSHANK.